May 25, 1948.   W. L. CALDWELL   2,442,036
METHOD AND APPARATUS FOR PRODUCTION OF EXPANDED SLAG
Filed June 7, 1944   2 Sheets-Sheet 1

Inventor:
Wallace L. Caldwell
By: Lee J. Gary
Attorney

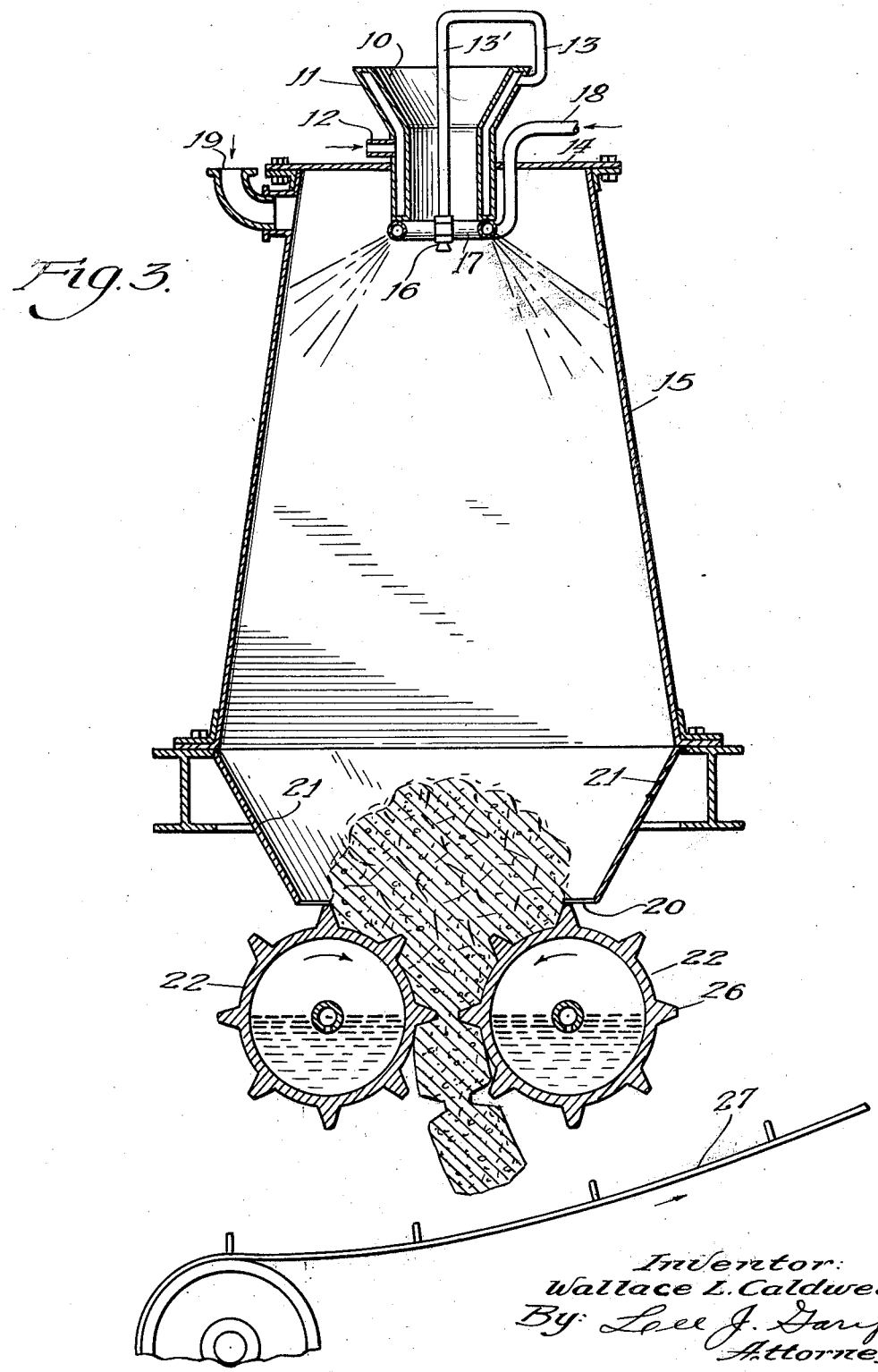

Patented May 25, 1948

2,442,036

UNITED STATES PATENT OFFICE 2,442,036

METHOD AND APPARATUS FOR PRODUCTION OF EXPANDED SLAG

Wallace L. Caldwell, Birmingham, Ala.; Leona Templeton Caldwell executrix of said Wallace L. Caldwell, deceased Application June 7, 1944, Serial No. 539,219

5 Claims. (Cl. 49—1)

This invention relates to novel apparatus for treatment of any molten slag, such as blast furnace slag, electric furnace slag, copper slag, lead slag, boiler slag, glass, or other molten slag-like material, and to a method for producing with this apparatus an expanded slag of superior quality for use in the production of lightweight aggregate.

Numerous methods are known for the production of expanded slags. Various specific types of apparatus have been employed for the expansion of slag by addition of water, steam or air, or by mechanical means. Most of the known methods for the expansion of slag to be used as an aggregate produce a product of inferior mechanical strength and of unsatisfactory durability. The main reason for the lack of adequate strength is that the methods of expansion which have been employed, produce invariably an expanded slag of light weight with relatively large and irregularly sized and shaped pores and a marked lack of uniformity of structure. It has been definitely shown that in order to produce a light weight aggregate having, in addition to light weight, a strong cell structure and fine pores and a regularly sized pores, that some further step in the processing beyond the mere expansion is necessary. The contact of molten slag with water or steam produces some sort of expanded slag regardless of the method of contact. Usually in those cases where a small amount of water is used the product is a so-called "popcorn" slag which is formed in relatively large lumps. When excess amounts of water are used, the slag is a so-called granulated slag which consists of small pellets or grains.

It is an object of this invention to provide a method and apparatus whereby the expanded slag may be further processed so as to form an expanded slag which, when crushed and screened, will provide an aggregate of exceptional quality. The process, as described herein, will produce large, irregular lumps or masses with fine and uniform cell structure and of a strong and tough quality. Aggregate is then produced from these masses by customary crushing and screening equipment.

In general my invention relates to the production of tough, light weight cellular aggregate from molten slag by disintegrating molten slag in a suitable apparatus, such as an expansion chamber, under controlled conditions regulated to form particles or pellets of hot, plastic cellular slag and the delivering of these particles while still in a hot plastic condition and containing sufficient heat to permit them to be welded together under pressure, to pressure means and specifically to externally positioned pressure rolls constructed and arranged to compact and weld masses of the hot plastic particles together into the form of enlarged unitary cellular masses of a relatively densified nature and fine cell structure, these enlarged masses being thereafter permitted to gradually cool and to anneal themselves by their contained heat to result in an expanded slag of superior quality and strength, which may thereafter be crushed for use as aggregate.

My invention will be further explained in connection with the accompanying drawings which more or less diagrammatically illustrate an arrangement of apparatus suitable for carrying out the method thereof.

Fig. 3 is a vertical section on the line 3—3 of Fig. 1 further diagrammatically illustrating the operation of the apparatus.

Figure 1:
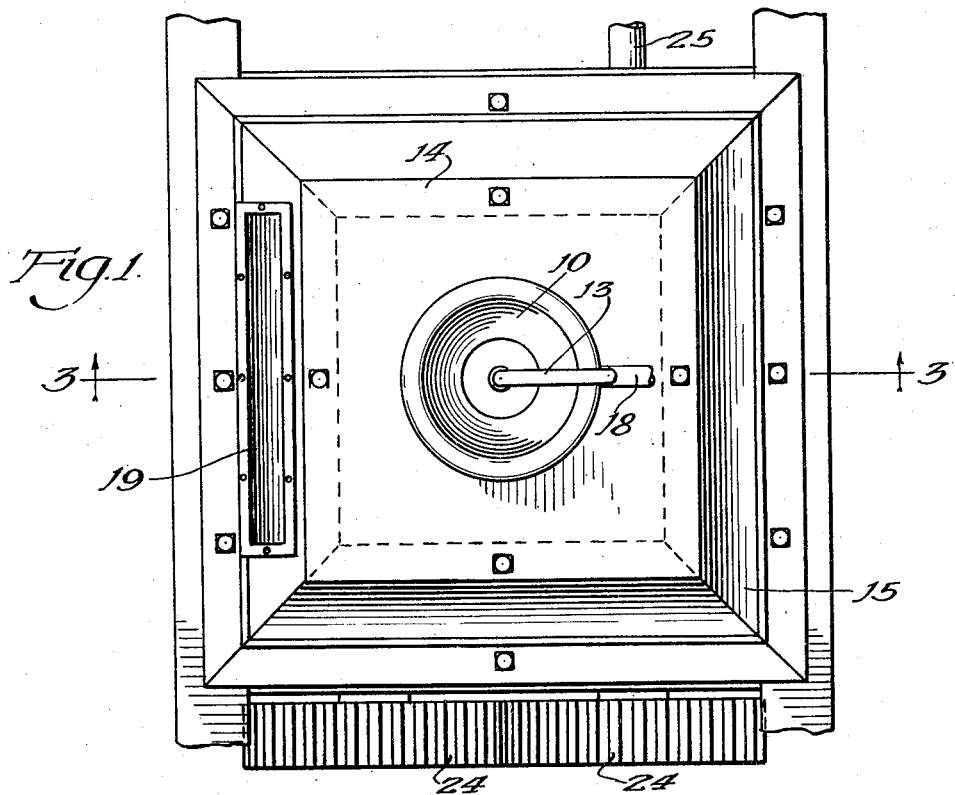
Fig. 1 is a fragmentary plan view of an arrangement of apparatus for carrying out the process of my invention.
Figure 2:
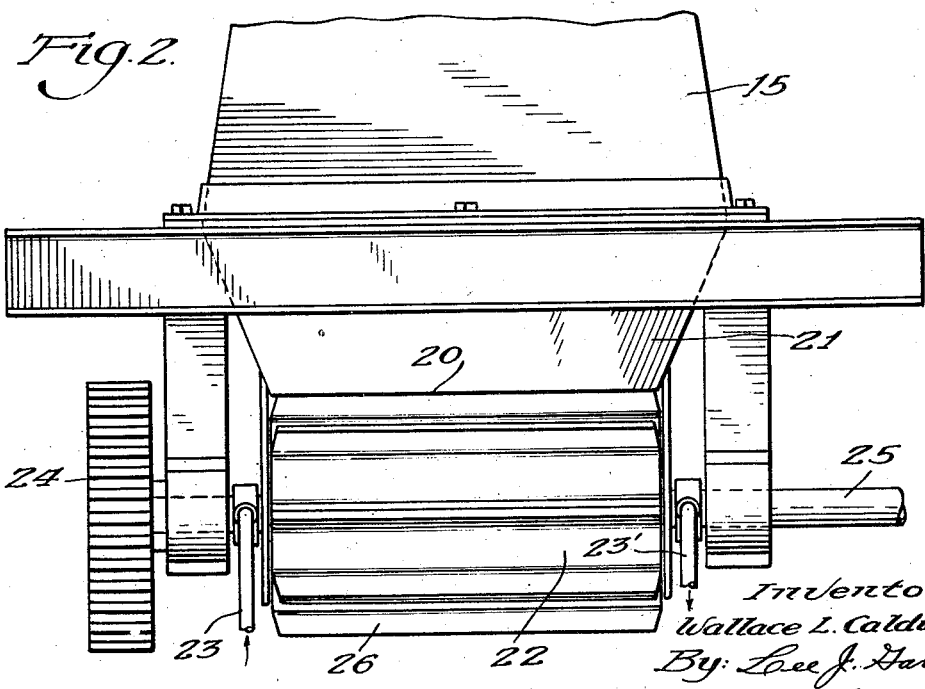
Fig. 2 is a fragmentary elevation thereof.

Referring to the drawings, molten slag from a runner, not illustrated, is introduced into slag inlet funnel 10, this funnel being preferably provided with a water jacket 11 to which water may be introduced through the conduit 12 and discharged through the conduit 13. It will be understood that the water jacket 11 is not for the purpose of controlling the temperature of the introduced slag but rather for the purpose of protecting the steel of which the inlet funnel 10 is composed when it is in contact with the hot slag. In the alternative, although not illustrated, it will be understood that the funnel 10 may be composed of refractory material.

The funnel 10 extends through the top 14 of the expansion chamber 15, and the slag introduced into the funnel 10 is discharged therefrom within the chamber 15 in the form of an annular or ring shaped stream of molten slag. As the annular stream of slag leaves the bottom of the funnel 10, it comes in contact with a high pressure jet of water discharged from the nozzle 16 which preferably opens below the lower terminus of the funnel, the nozzle being supported by the axially extending water supply conduit 13', which may be integral with the conduit 13 whereby the source of water is from the water jacket 11, or the conduit 13' in the alternative may be connected to an external water supply source. The nozzle 16 is constructed and arranged so as to discharge a jet of water under pressure in a radial direction either perpendicularly to or at a downwardly inclined angle to the stream of slag as it issues from the funnel 10. This high pressure water serves to disintegrate the continuous stream of slag by the action of the water upon the molten slag to cause violent expansion thereof, and in addition the jets of water being under high pressure will throw the resulting disintegrated particles of slag to the side walls of the expansion chamber 15. As the particles of expanded slag are thrown outwardly by the jets of water from nozzle 16, they may be additionally subjected to the action of jets of either high pressure steam, water or compressed air from peripheral jets in the tubular ring 17 supplied through the conduit 18, the ring 17 being mounted below and in juxtaposition to the inner terminus of the funnel 10.

The ring 17 is provided with apertures or nozzles arranged to cause the jets of high pressure, steam, water or compressed air to be directed downward and outward towards the side walls of the chamber 15, the action of these jets being to further disintegrate the particles of expanded slag and to further propel them towards the side walls of the chamber 15. In the process a great quantity of steam is evolved and the steam is permitted to escape from adjacent the top of the chamber 15 through the vent 19 which may lead to a stack or exhaust fan, not illustrated. As the molten slag is disintegrated by means of the primary jets of water issuing from the nozzle 16 and the secondary jets issuing from the ring 17, the resulting particles or pellets are permitted to fall by gravity to the bottom of the expansion chamber 15 and deflected towards the medial elongated base discharge opening 20 by means of the inclined converging chamber base walls or deflecting plates 21.

The expansion chamber 15 is primarily for the purpose of allowing for great increase in volume as the slag expands in its course downward therethrough, and may be of frusto-conical, frustro-pyramidal or other suitable contour for such purpose. The component defining walls of the expansion chamber 15 including the top 14 and the converging deflecting plates 21 thereof may be composed of refractory material or preferably of water-jacket steel construction, although such details are not illustrated and the drawings in this respect are considered to be diagrammatic. It will be understood, however, that such indicated water jacketing is not for the purpose of controlling the temperature of the slag but rather solely for cooling the steel plates when employed in contact with the hot slag to an extent necessary to prevent their destruction.

Control of the slag expansion and particle size thereof is regulated by the introduction of the molten slag to the funnel 10 in a continuous stream and at a constant rate and by the correlation thereto of the rate of flow and quantity of water introduced by nozzle 16 and the character and amount of supplementary expansion agent introduced through the ring 17 so that when the pellets or particles of expanded slag reach the base of expansion chamber 15 and are deflected medially thereof by the base deflection plates 21, they are still in a hot plastic condition retaining sufficient heat to enable the particles to be welded together under pressure.

As these slag particles or pellets in such hot plastic pressure weldable condition descend to the bottom of the expansion chamber, they are there grouped and directed by means of the deflecting plates 21 and through the elongated discharge opening 20 to the externally juxtaposed cooperating pair of spaced horizontally extending compressing rolls 22 which are in parallel relation to the discharge opening 20. These rolls 22 are preferably of hollow, water cooled construction, each being provided with for example a water inlet conduit 23 and outlet conduit 23' the rolls 22 being adapted for cooperative and joint rotation in opposed directions by means of the gears 24 and driven through suitable means, not illustrated, engaged to roll shaft 25. The rolls 22 are each provided with peripherally spaced radially extending longitudinal ribs 26, these ribs being in the form of pyramidal or the like teeth. Although not illustrated it will be understood that in place of such teeth the rolls 22 may be provided with longitudinally extending peripherally spaced angular corrugations, the purpose of the rolls being solely to compress and compact masses of hot plastic weldable particles or pellets of expanded cellular slag into the form of enlarged unitary relatively densified masses of cellular slag of fine cell structure, and the roll teeth or corrugations being not for the purpose of forming any definite shapes but for the purpose of insuring an absolutely positive continuous feed for the stream of slag particles and to progressively move them forward and to additionally provide planes of cleavage for the relatively enlarged and compacted expanded slag masses so as to permit these masses to separate and break somewhat irregularly and into lumps along these lines of demarcation or cleavage. After the slag particles pass through and are compacted by the rolls 22, the resulting masses are permitted to drop, as diagrammatically illustrated in Fig. 3, onto the conveyor 27 which moves beneath the rolls 22 transversely thereof.

As the compacted masses pass from the rollers 22, the surfaces thereof are quickly cooled by contact with the atmosphere but remain hot on the inside and are carried by the conveyor 27 to cooling bins wherein they are permitted to self-anneal and cool to masses of hardened and toughened material of uniformly fine cell structure. After such annealing and cooling the masses may be subjected to conventional crushing for use as light weight aggregate of very high quality and of modified refined cell structure.

I claim as my invention:

1. The method of producing tough light weight cellular aggregate from molten slag which comprises passing a stream of molten slag in annular form downwardly through an expansion chamber, and therein impinging a primary jet of water under pressure inwardly of, and secondary jets of fluid under pressure outwardly of and against said slag stream at controlled rates and in sufficient amounts to reduce the coherency of the slag and to disintegrate and expand it to the form of hot plastic cellular slag particles, continuously delivering said particles by gravity between opposed oppositely rotating confining surfaces to compact, weld and mould masses of said particles while in said hot plastic condition into enlarged unitary cellular masses, and thereafter gradually cooling said masses.

2. Apparatus for producing compressed masses of tough cellular slag of relatively uniform and fine cell structure from molten slag, comprising a vertically extending expansion chamber, means for introducing a molten slag stream adjacent the top thereof, means for impinging water under pressure against the slag stream within and adjacent the top of said chamber to disintegrate and expand the slag to cellular slag particles therein, said chamber having a base defined by convergent sides defining a constricted discharge opening for gravitational delivery of said particles while still in a hot plastic condition, and compression roll means below and in close proximity to said discharge opening for receiving said particles in said condition and for compacting and welding said particles together and for delivering them in the form of enlarged unitary cellular masses.

3. Apparatus for producing compressed masses of tough cellular slag of relatively uniform and fine cell structure from molten slag, comprising a vertically extending expansion chamber, means for introducing a molten slag stream adjacent the top thereof, means for impinging jets of fluid under pressure against the slag stream within and adjacent the top of said chamber to disintegrate and expand the slag to cellular slag particles therein, a hopper-like base closure for said chamber defining an elongated horizontally extending constricted discharge opening at the base of said chamber for gravitational discharge of said particles while still in a hot plastic condition, and compression roll means parallel to and in close proximity below said discharge opening for compacting and welding said particles together and for delivering them in the form of enlarged unitary cellular masses.

4. Apparatus for producing compressed masses of tough cellular slag of relatively uniform and fine cell structure from molten slag, comprising a vertically extending expansion chamber, funnel inlet means at the top of said chamber for introducing downwardly therein a stream of molten slag, means within said chamber adjacent said inlet for impinging water under pressure against the slag stream to expand and disintegrate it to the form of cellular slag particles, said chamber having a downwardly inclined base for deflecting and collecting the particles towards an elongated horizontally extending opening formed in said base, and pressure means comprising a pair of spaced oppositely rotatable compression rolls positioned immediately below and parallel to said base opening for receiving said particles while still in a hot plastic condition and for compacting and welding said particles together and for delivering them in the form of enlarged unitary cellular masses.

5. Apparatus for producing compressed masses of tough cellular slag of relatively uniform and fine cell structure from molten slag, comprising a vertically extending expansion chamber, funnel inlet means at the top of said chamber for introducing therein downwardly an annular stream of molten slag, primary jet means within said chamber adjacent said inlet for impinging water under pressure against the slag stream, extending axially of said funnel, to expand and distintegrate the molten slag stream to the form of cellular slag particles and secondary jet means for impinging added fluid under pressure against said slag to aid in the expansion and disintegration thereof, said chamber having a downwardly inclined base for deflecting and collecting said particles, while in hot plastic condition, towards an elongated horizontally extending opening formed in said base, and means for receiving, compacting and welding said particles together and for delivering them in the form of enlarged unitary cellular masses comprising a pair of oppositely rotatable spaced compression rolls positioned below and parallel to said opening, said rolls being formed with radially projecting longitudinally extending ribs.

WALLACE L. CALDWELL.

REFERENCES CITED

The following references are of record in the file of this patent:

UNITED STATES PATENTS

| Number | Name | Date |
| --- | --- | --- |
| 1,184,462 | Larson | May 23, 1916 |
| 1,458,858 | Sem | June 12, 1923 |
| 2,067,312 | Coryell | Jan. 12, 1937 |
| 2,118,707 | Ingouf | May 24, 1938 |
| 2,172,899 | Barnard | Sept. 12, 1939 |
| 2,236,691 | Meinzer | Apr. 1, 1941 |
| 2,382,290 | Callander | Aug. 14, 1945 |

FOREIGN PATENTS

| Number | Country | Date |
| --- | --- | --- |
| 143,500 | Great Britain | Apr. 7, 1921 |
| 227,848 | Great Britain | Dec. 31, 1925 |